Oct. 14, 1930.  E. KNECHT  1,778,678
DEMOUNTABLE ELECTRIC MOTOR
Filed March 26, 1928
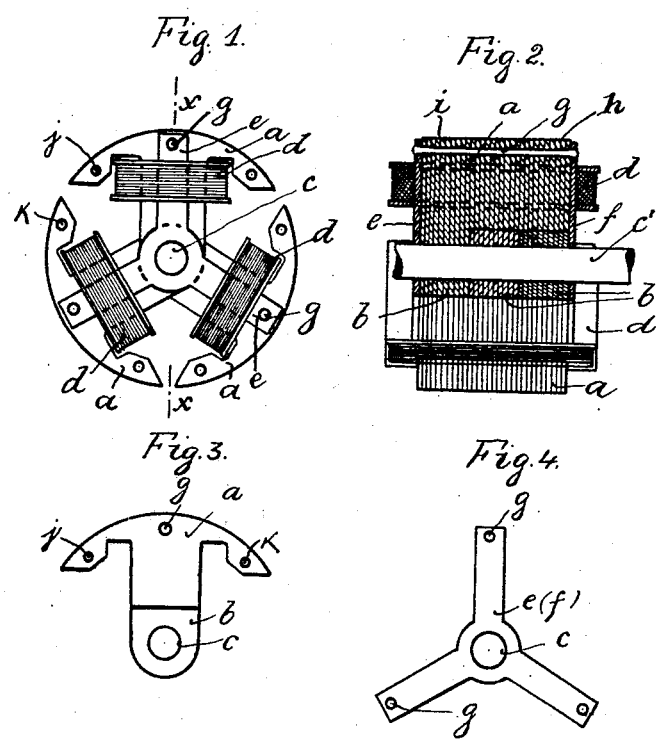

Patented Oct. 14, 1930

1,778,678

UNITED STATES PATENT OFFICE

EMIL KNECHT, OF ERKNER, NEAR BERLIN, GERMANY, ASSIGNOR TO EDWARD D. FELDMAN, OF NEW YORK, N. Y.

DEMOUNTABLE ELECTRIC MOTOR

Application filed March 26, 1928, Serial No. 264,840, and in Germany January 24, 1928.

This invention relates to demountable electric motors; and it comprises a particular type of armature structure adapted for use on talking machines and the like; said armature being readily dismantled or taken apart.

In the accompanying illustration I have shown, more or less diagrammatically, a typical embodiment of the present invention. In this showing:

Fig. 1 is an end elevation;

Fig. 2 is a cross section on line $x$—$x$ of Fig. 1;

Fig. 3 shows one of the so-called "teeth" of the armature; and

Fig. 4 shows one of the end spiders.

This invention relates to armatures which are built up of a plurality of teeth which carry the coil windings, the number of teeth and coil windings to be used being a matter of choice and determined by the particular motor which it is desired to produce. For purposes of illustration there is shown an armature having three such teeth with coil windings thereon. It is within the scope of the invention to construct armatures having two or more teeth, as desired. The armature illustrated is a three-part armature; i. e., one having three coil windings arranged at 120° to each other. The body of the armature is composed of a plurality of T-shaped teeth $a$. The T-shaped teeth $a$ are of a built up or laminated structure. The laminations used are of to different forms $h$ and $i$ as shown in Figure 2. The two forms of laminations used are such that the built-up teeth will have the form as shown in Fig. 3. The laminations are of the same general form, the only difference being that the laminations $i$ have a somewhat longer leg, the lower portion of which is perforated at $c$. The proper number of each of these laminations $h$ and $i$ are assembled to give a tooth which has a T-shaped head and a stem $b$ composed of the extended legs of the laminations $i$. The perforations at $c$ of each lamina will be concentric and form a hole for the reception of the armature shaft. The number of laminations $h$ and $i$ used are so proportioned that the width of the assembled stem $b$ is one-third the width of the head portion of the T-shaped tooth. The laminations are so assembled that the stems $b$ of each of the teeth are so offset that when three of the teeth are assembled on the shaft the leg portions of the teeth will so interfit, as shown in Fig. 2, to give a solid and unitary armature core. The laminations $h$ and $i$ are held together by pins or rivets passed through the holes $j$ and $k$ in the head portion of the laminations to form a unit tooth. A coil $d$ is mounted on each of teeth $a$. The teeth are clamped together by means of three-arm spiders $e$ and $f$ mounted on the shaft at the end of the assembled teeth and tied together by bolts or rivets $g$ or the like. The spiders $e$ and $f$ hold and maintain the teeth $a$ with a fixed and definite angle between them.

The armature produced in accordance with the above disclosure has a very compact structure, is easily and quickly assembled and is readily dismantled or taken apart when the same needs repairing. The method of assembling the parts of the armature is as follows: A proper number of laminations $h$ and $i$ are assembled placing the laminations $i$ in the proper position to form stem $b$ in the proper position for interfitting with the other teeth. The laminations are united together by means of pins or rivets passed through the holes $j$ and $k$ to produce the unit tooth. The coils $d$ are placed over the arms of a pair of spiders $e$ and $f$. The teeth are then properly positioned between the spiders $e$ and $f$ so that the spiders are between the coil $d$ and the teeth $a$. The holes at $c$ and $g$ are lined up and pins or rivets are inserted in holes $g$, securing the parts together. Then the armature shaft $c'$ is passed through the holes $c$. In this manner the finished armature is produced and is ready to be assembled in the motor.

What I claim is:

1. A built-up armature structure for demountable electric motors comprising a plurality of separate T-shaped teeth angularly displaced from one another, each tooth being of laminated structure and having a stem portion perforated to receive an armature shaft, the width of said stem portion being $\frac{1}{n}$ the width of the head portion of the tooth where $n$ is equal to the number of teeth, the stem portion of each tooth being so positioned relative to the head portion that when the teeth are assembled the stem portions of the teeth will interfit, and an armature shaft passing through the perforation in the stem portion of the teeth.

2. A built up armature structure for demountable electric motors, comprising an armature shaft, a plurality of separate T-shaped coil-carrying members the stems of which are perforated and mounted in alignment on said armature shaft by means of such perforations, field coils carried by said teeth, a spider on each end of said armature shaft, and means tying said spiders together to hold the T-shaped members on said shaft at angles to each other.

3. A built up armature structure for demountable electric motors, comprising an armature shaft, a plurality of separate T-shaped teeth the stems of which are perforated and mounted on said armature shaft in alignment by means of said perforations, a field coil carried by each tooth, and means arranged to clamp all the teeth together in angular arrangement on said armature shaft.

4. A built up armature structure for demountable electric motors, comprising an armature shaft, three separate T-shaped teeth, the stems of which are perforated and mounted by means of said perforations on said shaft at 120° to each other, a field coil carried by each tooth, a spider at each end of the shaft, and means to clamp said spiders against the teeth to hold them in position on said shaft.

In testimony whereof I affix my signature.

EMIL KNECHT.